Patented Feb. 14, 1950

2,497,292

UNITED STATES PATENT OFFICE 2,497,292

PREPARATION OF N-ISOBUTYL HEXA-METHYLENEDIAMINES

Walter M. Bruner, Wilmington, Del., assignor to E. I. du Pont de Nemours & Company, Wilmington, Del., a corporation of Delaware No Drawing. Application May 7, 1946, Serial No. 668,018

3 Claims. (Cl. 260—583)

This invention relates to methods of making secondary diamines, and to products obtained by such methods. This invention is a continuation-in-part of the copending application S. N. 517,984, filed January 12, 1944, now abandoned.

Heretofore N-alkyl diaminoalkanes have been prepared by various methods, such as by reacting dibromoalkanes with primary amines.

An object of this invention is to provide a less expensive improved process for the manufacture of secondary diamines which are of value as polyamide intermediates. Another object is to provide novel and useful polyamide intermediates, suitable for use in making polyamide resins having unique elastic properties. Another object is to prepare N-isobutyl hexamethylenediamines. Other objects of the invention will appear hereinafter.

These objects are accomplished in accordance with the invention by hydrogenation of a mixture of dicyanoalkane and carbonyl compound, or by hydrogenation of a condensation product of carbonyl compound and diaminoalkane (which in turn is obtainable by hydrogenating the said dicyanoalkane). Either the N-monoalkyl or N,N'-dialkyl diaminoalkanes can thus be prepared, the course of the reaction depending primarily on the relative molal proportions of the reactants present, as hereinafter disclosed in detail. One of the surprising features of this invention is that the reaction products contain only a minor proportion of tertiary amines, or, in many instances, substantially no tertiary amines.

The carbonyl compounds which are effective as reactants in the present invention include aldehydes and ketones, such as paraformaldehyde, Formalin, acetaldehyde, propionaldehyde, isobutyraldehyde, n-butyraldehyde, acrolein, acetone, ethyl methyl ketone, cyclohexanone and the like. The aliphatic aldehydes and ketones, and the cycloaliphatic ketones react very satisfactorily. This is especially true of formaldehyde, and aldehydes or ketones containing more than 3 carbon atoms. Tarry condensation products sometimes interfere when the aldehyde reactant is acetaldehyde. As the dicyanoalkane reactant, any of the dicyanoalkanes may be used, such as dicyanomethane, 1,2-dicyanoethane, 1,3-dicyanopropane, 1,3-dicyanobutane, 1,4-dicyanobutane, 1,8-dicyanooctane, 1,10-dicyanodecane and the like. When reaction mixtures containing approximately equimolal amounts of carbonyl compound and dicyanoalkane are hydrogenated, a product is obtained which contains N-monoalkyl diaminoalkane, together with by-product comprising appreciable amounts of the diaminoalkane which is simultaneously produced by hydrogenation of the dicyanoalkane, and an alcohol, resulting from hydrogenation of the carbonyl compound. Formation of the by-product diaminoalkane is suppressed by employing a reaction mixture which contains dicyanoalkane and an excess of the carbonyl compound. Thus, when the molal proportion of carbonyl compound to dicyanoalkane initially is 4:1, the conversion of dicyanoalkane to N,N'-dialkyldiaminoalkane is about 60 to 65% of the theoretical, and the conversion to diaminoalkane and N-monoalkyl diaminoalkane is about 1%. The reactions involved in the formation of the N-alkyl diaminoalkanes may be written as follows (1) $NC(CH_2)_xCN + R'COR'' + 5H_2 \rightarrow$
$H_2O + H_2N(CH_2)_{x+2}NHCHR'R''$ (2) $NC(CH_2)_xCN + 2R'COR'' + 6H_2 \rightarrow$
$2H_2O + R''R'CHNH(CH_2)_{x+2}NHCHR'R''$ wherein $x$ is an integer, R' and R'' are from the group consisting of hydrogen and alkyl groups. Reaction (2) takes place when more than one mole of carbonyl compound is present per mol of the dinitrile.

In the hydrogenation of mixtures of dicyanoalkane and carbonyl compound in accordance with this invention, any suitable hydrogenation catalyst may be employed. Good results are obtained with nickel alloy skeleton catalysts, nickel-on-kieselguhr, reduced platinum oxide, and catalysts made by reducing fused or sintered cobalt oxides. The hydrogenation may be effected at room temperature or at higher temperatures, suitably in the range of 20° to 250° C. Particularly good results are obtained at 80° to 150° C. Pressures may be atmospheric or higher, preferably 30 to 1000 atmospheres. The reaction rate depends in part upon the quantity of catalyst present, a reaction time of from less than one hour to about three hours being required when the weight of catalyst is about one half of the weight of diaminoalkane charged. If desired, the hydrogenation may be conducted in the presence of an inert solvent such as methanol or cyclohexane.

For certain purposes it is desirable to direct the course of the hydrogenation to the formation of mixtures of N-monoalkyl diaminoalkane and N,N'-dialkyl diaminoalkane, rather than to products which contain either the mono or the di N-alkyl compound to the exclusion of the other. Certain of the compositions of the present invention consist substantially of N-monoalkyl and N,N'-dialkyl diaminoalkanes in about equimolal proportions. These mixtures which are conveniently made by hydrogenating reactants containing about 1.0 to 2 moles of carbonyl compound per mole of dicyanoalkane, are of value in the manufacture of high quality polyamides. For instance, a mixture consisting substantially of N-isopropyl-1,6-diaminohexane and N,N'-diisopropyl-1,6-diaminohexane in about equimolal proportions is prepared by hydrogenating a solution containing about 1.5 moles of acetone and 1.0 mole of 1,4-dicyanobutane.

This invention will be illustrated further by the following examples.

*Example I.*—A Schiff base of the formula

(CH₃)₂CHCH=N(CH₂)₆N=CHCH(CH₃)₂

(obtained by reaction between hexamethylenediamine and an excess of isobutyraldehyde) was hydrogenated at 130° C. under 700 atmospheres pressure for 2 hours in the presence of a finely divided nickel-on-kieselguhr catalyst. The resulting product was distilled, yielding 40 grams of N,N'-diisobutyl-1,6-diaminohexane, B. P. 123° C. at about 2 mm. pressure.

*Example II.*—A mixture containing 36.1 grams (0.5 mole) isobutyraldehyde, 54 grams (0.5 mole) 1,4-dicyanobutane, 100 grams of methanol and 27 grams of a catalyst made by reducing fused cobalt oxide was heated with hydrogen under 510 to 745 atmospheres pressure at 108° to 114° C. in an agitated, silver-lined, autoclave for 165 minutes. The product was thereafter discharged from the autoclave, freed of catalyst and methanol, then distilled, yielding (1) 21.8 grams of foreshot which boiled at 25° to 45° C., 9 mm. (chiefly water and isobutanol) (2) 17.1 grams of 1,6-diaminohexane, boiling point 84° to 89° C., 9 mm., (3) 13.5 grams N-isobutyl-1,6-diaminohexane, boiling point 107° to 113° C., 9 mm. (neutralization equivalent, 87.3; theory requires 86.10), (4) 16.5 grams high boilers, B. P. 120° to 135° C., 9 mm., and (5) 13.2 grams of distillation heel. The distillation heel contained a small amount of a colorless water-insoluble oil, B. P. 123° C. at 2 mm., which was identified as N,N'-diisobutyl-1,6-diaminohexane (per cent N found, 12.19%; calc. 12.3%).

*Example III.*—A mixture containing 116.1 grams acetone, 54.0 grams 1,4-dicyanobutane and 27 grams of reduced cobalt oxide catalyst was heated with hydrogen under 200 to 760 atmospheres pressure at 124° to 140° C., in an agitated, silver-lined autoclave for 135 minutes. The product was thereafter discharged from the autoclave, freed of catalyst and distilled, yielding a foreshot containing isopropanol, and then the following cuts: (1) 0.5 gram 1,6-diaminohexane, B. P. 54° C., 3 mm., (2) 61.2 grams N,N'-diisopropyl-1,6-diaminohexane, B. P. 77°, 2 mm. (refractive index at 25° C., 1.4391; neutralization equivalent of heart cut, 100.6; theory requires 100.11), (3) 12.4 grams of high boilers, B. P. 79°, 2 mm. to 155°, 3 mm., and (4) 4.2 grams distillation heel.

*Example IV.*—A mixture containing 49.1 grams cyclohexanone, 54 grams 1,4-dicyanobutane and 27 grams of reduced cobalt oxide catalyst in 100 c.c. of methanol was heated with hydrogen under 580 to 700 atmospheres pressure at 113° to 127° C. for 2.75 hours. The resulting mixture was filtered and distilled, yielding a fraction (10.7 grams) which boiled at 141° to 147° C. at 9 mm. Analysis of this material showed it to be N-cyclohexyl-1,6-diaminohexane (neutralization equivalent, found, 98.7; calc., 99.1). A small amount (6.6 grams) of N,N'-dicyclohexyl-1,6-diaminohexane, which boiled at 151° to 155° C. at 8 mm., also was obtained.

*Example V.*—A mixture containing 29.1 grams acetone, 54.0 grams of 1,4-dicyanobutane, 27 grams of reduced sintered cobalt oxide catalyst, and 100 c.c. of methanol was processed with hydrogen under 575 to 800 atmospheres pressure at 100° to 120° C. The product was filtered and subsequently distilled yielding the following fractions: (1) methanol, (2) 85° to 88° C., 10 mm., (weight, 13.2 grams) identified as 1,6-diaminohexane, (3) B. P. 88° to 96°, 10 mm., (4) B. P. 96° to 99°, 10 mm. (weight, 22.5 grams) identified as N-isopropyl-1,6-diaminohexane and (5) unidentified products which had a boiling range from 113° C. at 7 mm. to 184° C. at 2.6 mm. (weight, 10.5 grams), and (6) a distillation heel (weight, 4.6 grams).

The products obtained in accordance with this invention are valuable as polyamide intermediates. This is especially true of N-monoisobutyl and N,N'-diisobutyl-1,6-diaminohexanes, the polymeric sebacamides of which have outstanding elasticity and strength.

It is to be understood that this invention is not limited to the specific embodiments described in these examples, but that other modes of applying the principle of the invention may be employed without departing from the spirit and scope thereof.

I claim:

1. A compound of the class consisting of N-isobutyl-1,6-diaminohexane and N,N'-diisobutyl-1,6-diaminohexane.
2. N,N'-diisobutyl-1,6-diaminohexane.
3. N-isobutyl-1,6-diaminohexane.

WALTER M. BRUNER.

REFERENCES CITED

The following references are of record in the file of this patent:

UNITED STATES PATENTS

| Number | Name | Date |
|---|---|---|
| 1,992,615 | Hoffmann et al. | Feb. 26, 1935 |
| 2,160,578 | Schmidt | May 30, 1939 |
| 2,317,757 | Graf | Apr. 27, 1943 |
| 2,349,461 | Pratt et al. | May 23, 1944 |

FOREIGN PATENTS

| Number | Country | Date |
|---|---|---|
| 558,423 | Great Britain | Jan. 5, 1944 |

OTHER REFERENCES

V. Braun: "Ber. deut. chem.," 43, 2856–2864 (1910).

Johnson et al.: "J. Am. Chem. Soc.," 38, 1854–1860 (1916).

V. Braun et al.: "Ber. deut. chem.," 6, 1533–1534 (1927).